(12) United States Patent
Ben-Moshe et al.

(10) Patent No.: US 11,868,759 B2
(45) Date of Patent: Jan. 9, 2024

(54) SHADER SOURCE CODE PERFORMANCE PREDICTION

(71) Applicant: Advanced Micro Devices, Inc., Santa Clara, CA (US)

(72) Inventors: Amit Ben-Moshe, Boston, MA (US); Ian Charles Colbert, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 21 days.

(21) Appl. No.: 17/545,801

(22) Filed: Dec. 8, 2021

(65) Prior Publication Data

US 2023/0176847 A1  Jun. 8, 2023

(51) Int. Cl.
*G06F 8/65* (2018.01)
*G06T 15/00* (2011.01)
*G06N 20/00* (2019.01)
*G06F 8/51* (2018.01)
*G06F 8/41* (2018.01)

(52) U.S. Cl.
CPC .............. *G06F 8/65* (2013.01); *G06F 8/443* (2013.01); *G06F 8/51* (2013.01); *G06N 20/00* (2019.01); *G06T 15/005* (2013.01)

(58) Field of Classification Search
CPC .......... G06F 8/441; G06F 8/425; G06F 8/443; G06F 8/51; G06F 8/65
See application file for complete search history.

(56) References Cited

U.S. PATENT DOCUMENTS

| 2010/0141678 | A1  | 6/2010  | Abdo et al. |
| 2015/0348224 | A1  | 12/2015 | Avkarogullari et al. |
| 2016/0179490 | A1* | 6/2016  | Lee ......................... G06F 8/447 717/146 |
| 2020/0380754 | A1* | 12/2020 | Nevraev ................... G06T 1/20 |
| 2021/0294579 | A1  | 9/2021  | Ben-Moshe et al. |

(Continued)

OTHER PUBLICATIONS

"Machine Learning: Strengthening Performance Predictions", Computing LLNL [retrieved Oct. 12, 2021]. Retrieved from the Internet <https://computing.llnl.gov/projects/machine-learning-strengthens-performance-predictions>., 2 Pages.

(Continued)

*Primary Examiner* — Duy Khuong T Nguyen
(74) *Attorney, Agent, or Firm* — FIG. 1 Patents

(57) ABSTRACT

Shader source code performance prediction is described. In accordance with the described techniques, an update to shader source code for implementing a shader is received. A prediction of performance of the shader on a processing unit is generated based on the update to the shader source code. Feedback about the update is output. The feedback includes the prediction of performance of the shader. In one or more implementations, generating the prediction of performance of the shader includes compiling the shader source code with the update to generate a representation of the shader, inputting the representation of the shader to one or more machine learning models, and receiving the prediction of performance of the shader as an output from the one or more machine learning models.

20 Claims, 8 Drawing Sheets

(56) References Cited

U.S. PATENT DOCUMENTS

2022/0058476 A1* 2/2022 Calidas ................ G06N 3/08

OTHER PUBLICATIONS

"Program Performance Prediction with Deep Learning", CSAIL [retrieved Oct. 12, 2021]. Retrieved from the Internet <https://www.csail.mit.edu/research/program-performance-prediction-deep-learning>., Apr. 28, 2020, 3 Pages.

Braun, Lorenz et al., "A Simple Model for Portable and Fast Prediction of Execution Time and Power Consumption of GPU Kernels", Cornell University arXiv, arXiv.org [retrieved Oct. 12, 2021]. Retrieved from the Internet <https://arxiv.org/pdf/2001.07104.pdf>., Jan. 20, 2020, 23 Pages.

Chennupati, Gopinath et al., "Machine Learning Enabled Scalable Performance Prediction of Scientific Codes", Cornell University arXiv, arXiv.org [retrieved Oct. 12, 2021]. Retrieved from the Internet <https://arxiv.org/pdf/2010.04212.pdf>., Nov. 12, 2020, 28 Pages.

U.S. Appl. No. 17/205,993, filed Aug. 4, 2022, "Non-Final Office Action", U.S. Appl. No. 17/205,993, filed Aug. 4, 2022, 13 pages.

U.S. Appl. No. 17/205,993, filed Apr. 13, 2023, "Final Office Action", U.S. Appl. No. 17/205,993, filed Apr. 13, 2023, 16 pages.

* cited by examiner

SHADER SOURCE CODE PERFORMANCE PREDICTION

BACKGROUND

A shader is a program that runs on a stage (e.g., a programmable stage) of a processing unit (e.g., a graphics processing unit (GPU)). In various deployments, for example, shaders provide code for programmable stages of rendering pipelines. In scenarios involving a rendering pipeline, a shader is run on a respective processing unit to perform one or more calculations in connection with rendering a scene for display on a display device.

BRIEF DESCRIPTION OF THE DRAWINGS

The detailed description is described with reference to the accompanying figures.

DETAILED DESCRIPTION

Overview

Figure 1:
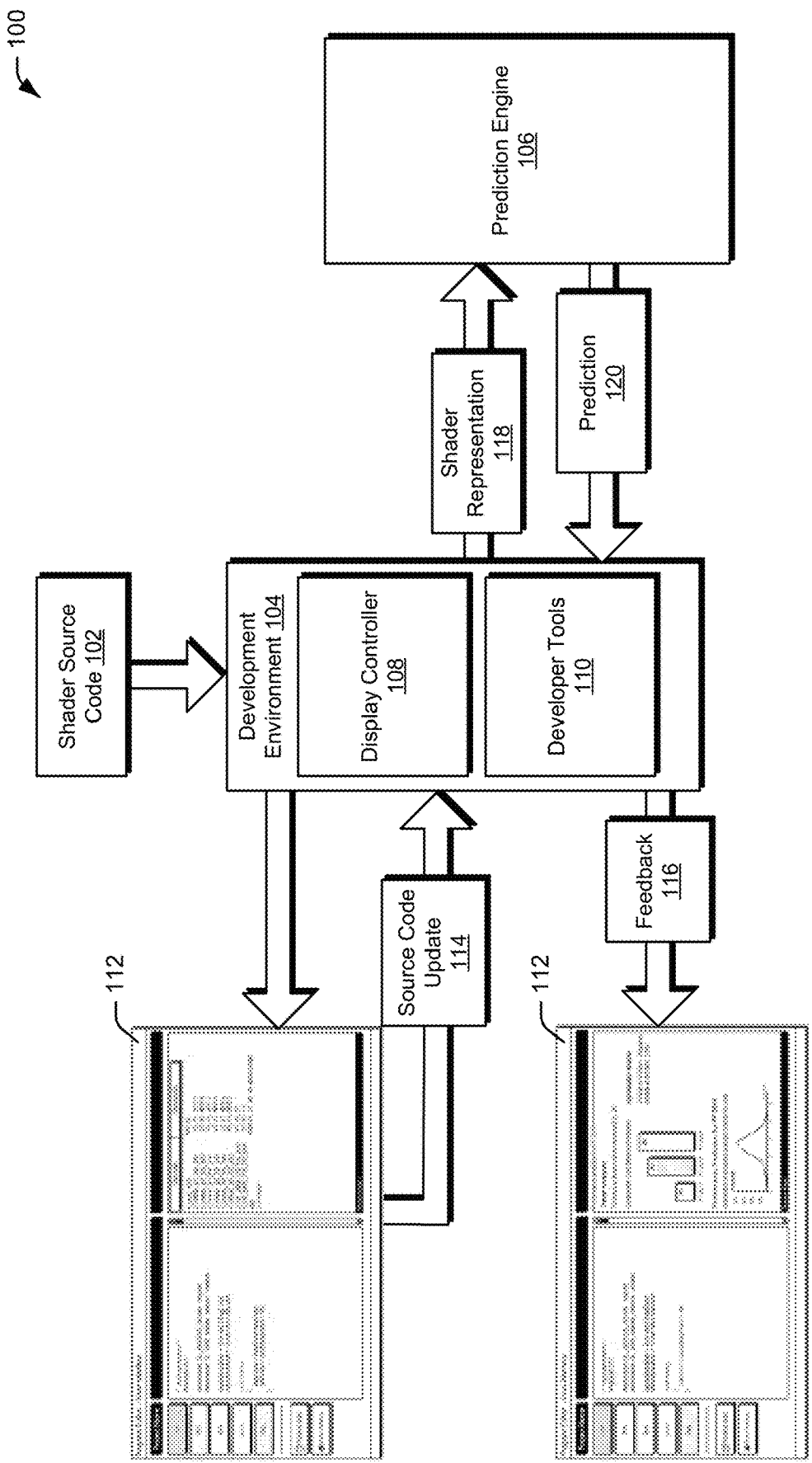
FIG. 1 is a block diagram of a non-limiting example system having a prediction engine that predicts performance of a shader on a processing unit from source code of the shader according to some implementations.

During development of a shader, developers are unable to obtain an accurate prediction of whether updates to the source code for the shader will have a positive or negative effect on the performance of the shader on a processing unit. Conventionally, in order to predict performance of a shader, a developer runs the finished code on an actual processing unit but doing so requires the developer to have access to the processing unit itself. Moreover, the time to run the code on the processing unit, measure the performance, and determine the reasons for an increase or decrease in performance is cumbersome and time consuming, while also causing a break in the flow of development. Alternately, the source code could be simulated or emulated, but simulators and emulators are expensive and require extensive developer time to build. Additionally, running a shader in a simulation and measuring performance also consumes valuable time and ties up computing resources. Moreover, even if a developer has access to the processing unit, a simulator, or an emulator, it can be difficult to pinpoint the reasons for increased or decreased performance of the shader relative to previous versions of the shader. The performance of a shader may also vary across different processing units, making it difficult to accurately determine whether an update to the shader will improve performance of the shader across multiple different processing units.

To solve these problems, shader source code performance prediction is leveraged. A development environment provides developer tools including a user interface for developing source code for a shader. A developer interacts with the developer tools to make updates to the shader source code, such as by adding a line of code to the shader source code via the user interface, removing a line of code from the shader source code, or making a modification within a line of the shader source code. In one or more examples, the developer tools also enable the developer to make changes which are different from updates made directly to the shader source code, such as by making a change to a compiler setting which is used for compiling the shader (e.g., changing an optimization flag) or changing an application programming interface (API) state of a pipeline associated with the shader. Responsive to the update, feedback is provided to the developer via the user interface. The feedback, for example, includes performance predictions, such as whether the source code update will cause the performance of the shader on a processing unit to improve or decline as compared to a previous version of the source code prior to the update.

The feedback is provided in real-time, as the developer is editing the source code for the shader. Thus, the feedback provides a basis for further updates to the shader source code. In other words, based on the feedback, the developer can decide whether to undo the source code update, keep the source code update in the shader source code, or attempt to introduce additional updates to the shader source code. In this way, the development environment provides a guided optimization process that enables the developer to make changes to the shader source code to improve the performance of the shader during development. For example, the developer can continue to interact with the user interface to incrementally update the shader source code, and then view the feedback with performance predictions to decide whether more updates are warranted. This process can continue through any number of iterations until the shader source code is optimized.

In accordance with various implementations, a prediction engine generates the prediction about performance of the shader based on the updated shader source code using one or more machine learning models. Leveraging the machine learning models to generate the predictions eliminates the need to run the shader (on the actual processing units or in a simulation of those processing units) and measure performance of the shader as run. Because the shader need not be run on the actual processing unit, the developer or entity optimizing the shader does not need to purchase or otherwise access the hardware processing unit. Moreover, generating predictions of shader performance using the machine learning models guides the developer in real-time (or near real-time) as updates to the code are received and processed. Conventional techniques that involve running a shader (e.g., on a processing unit or in a simulation) and measuring performance of the shader are not capable of providing real-time or even near real-time feedback. This is because the runtime of shaders and collection of information introduce too much lag to enable real-time feedback to be provided. In some cases, the machine learning models are trained with data for multiple processing units which enables the machine learning models to predict the performance of a shader on each of those multiple processing units thereby allowing the developer to optimize the shader for multiple processing units.

In some aspects, the techniques described herein relate to a method including: receiving an update to shader source code for implementing a shader; generating a prediction of performance of the shader on a processing unit based on the update to the shader source code; and outputting feedback about the update, the feedback including the prediction of performance of the shader.

In some aspects, the techniques described herein relate to a method, wherein generating the prediction of performance of the shader further includes: compiling the shader source code with the update to generate a representation of the shader; inputting the representation of the shader to one or more machine learning models trained based on historical data describing performance of one or more other shaders on the processing unit; and receiving the prediction of performance of the shader as an output from the one or more machine learning models.

In some aspects, the techniques described herein relate to a method, wherein the prediction of performance is generated without running or simulating the shader on the processing unit.

In some aspects, the techniques described herein relate to a method, wherein the prediction of performance includes an estimation of a statistic based on execution time of the shader to perform at least one operation for the processing unit.

In some aspects, the techniques described herein relate to a method, wherein the statistic based on execution time includes an average execution time of the shader to perform the at least one operation for the processing unit.

In some aspects, the techniques described herein relate to a method, wherein the statistic based on execution time includes a variance in execution time of the shader to perform the at least one operation for the processing unit.

In some aspects, the techniques described herein relate to a method, wherein the prediction of performance includes a predicted trend between a first performance prediction of the shader before the update to the shader source code and a second performance prediction of the shader after the update to the shader source code.

In some aspects, the techniques described herein relate to a method, wherein the predicted trend includes a percentage improvement in the performance of the shader.

In some aspects, the techniques described herein relate to a method, wherein the predicted trend includes a percentage decline in the performance of the shader.

In some aspects, the techniques described herein relate to a method, wherein the update to the shader source code includes at least one of: an addition of at least one line of code to the shader source code; removal of at least one line of code from the shader source code; a modification within at least one line of code of the shader source code; or a change to compiler settings.

In some aspects, the techniques described herein relate to a method, wherein the update is received via user input to a user interface, and wherein the feedback about the update is output via the user interface.

In some aspects, the techniques described herein relate to a method, wherein the update is received from an automated bot, and wherein the feedback about the update is output to the automated bot.

In some aspects, the techniques described herein relate to a method, further including generating an additional prediction of performance of the shader on at least one additional processing unit based on the update to the shader source code, wherein the feedback further includes the additional prediction of performance of the shader.

In some aspects, the techniques described herein relate to a system including: at least one developer tool to update shader source code for implementing a shader; a compiler to generate a representation of the shader by compiling the updated shader source code; and a prediction engine to generate a prediction of performance of the shader on a processing unit by processing the representation of the shader using one or more machine learning models.

In some aspects, the techniques described herein relate to a system, wherein the one or more machine learning models are trained based on historical data describing performance of one or more other shaders on the processing unit.

In some aspects, the techniques described herein relate to a system, further including a display controller to display the prediction of performance of the shader in a user interface.

In some aspects, the techniques described herein relate to a system, wherein the compiler generates the representation of the shader in an intermediate language.

In some aspects, the techniques described herein relate to a method including: receiving a shader representation of a shader, the shader representation generated by compiling shader source code for the shader; generating a first performance prediction of the shader on a processing unit based on the shader representation; receiving an updated shader representation of the shader, the updated shader representation generated by compiling the shader source code after an update to the shader source code; generating a second performance prediction of the shader on the processing unit based on the updated shader representation; and determining a predicted trend of the shader by comparing the first performance prediction of the shader to the second performance prediction of the shader, the predicted trend indicating an improvement or decline in performance of the shader caused by the update to the shader source code.

In some aspects, the techniques described herein relate to a method, further including outputting, in a user interface, the predicted trend indicating the improvement or decline in the performance of the shader caused by the update to the shader source code.

In some aspects, the techniques described herein relate to a method, further including outputting, in the user interface, the second performance prediction of the shader, the second performance prediction of the shader displayed concurrently with the predicted trend in the user interface.

FIG. 1 is a block diagram of a non-limiting example system 100 having a prediction engine that predicts performance of a shader on a processing unit from source code of the shader according to some implementations. In particular, the system 100 includes shader source code 102, development environment 104, and prediction engine 106.

In accordance with the described techniques, the shader source code 102 implements a shader or a pipeline of shaders, e.g., the shader source code 102 is configured to be compiled by a compiler to produce a shader or a pipeline of shaders. A shader is a program that runs on a stage (e.g., a programmable stage) of a processing unit (e.g., a graphics processing unit (GPU)). In various deployments, for example, shaders provide code for programmable stages of rendering pipelines. In some variations involving a rendering pipeline, a shader is run on a respective processing unit to perform one or more calculations in connection with rendering a scene for display on a display device, including, for example, calculations for: shading; altering a position of pixels, vertices, and/or textures; altering hue, saturation, brightness, and/or contrast; producing blur, light bloom, volumetric lighting, a normal mapping (for depth effects), bokeh, cel shading, posterization, bump mapping, distortion, chroma keying, and, edge and motion detection. Additionally or alternatively, shaders provide code for various on-processing unit computations, including, for instance, on-GPU computations such as general-purpose computing on graphics processing units. It is to be appreciated that shaders are run on processing units in some implementations to provide different functionality from the functionality listed above without departing from the spirit or scope of the techniques described herein.

The development environment 104 supports development of shaders, such as one or more shaders implemented using the shader source code 102. In this example, the development environment 104 includes display controller 108 and developer tools 110. The display controller 108 causes output of a user interface 112 of the development environment 104. For example, the display controller 108 causes the user interface 112 to be displayed via a display device (not shown). Alternatively or additionally, the display controller 108 causes the user interface 112 (or a portion of the user interface 112) to be output in different ways, such as audibly via a voice assistant device.

In various implementations, the user interface 112 presents information (e.g., to a user) that is related to updating the shader source code 102 and generating a shader from the shader source code 102. For example, the display controller 108 causes the user interface 112 to display the shader source code 102 (or portions of the code) in one or more scenarios. The display controller 108 also enables a user to interact with the developer tools 110 via the user interface 112 to update the shader source code 102. In accordance with the described techniques, for instance, the display controller 108 is configured to receive user input for interacting with the developer tools 110 such as to receive touch input via a touch enabled display device, keyboard input, stylus input, mouse input, and verbal commands. In one or more implementations, the system 100 provides tools that enable a user to provide input to update the shader source code 102 outside the development environment 104, such as by using an integrated development environment of the user's choice (or a text editor).

Responsive to such user input, the developer tools 110 or other code updating tools perform various operations on the shader source code 102. Examples of operations performed on the shader source code 102 by the developer tools 110 and responsive to user input include, but are not limited to, adding a line of code to the shader source code 102, removing a line of code from the shader source code 102, and making a modification within at least one line of the shader source code 102. In one or more implementations, the developer tools 110 facilitate updating the shader source code 102 in a "high-level" language, examples of which include High-Level Shader Language (HLSL) and OpenGL Shading Language (GLSL). It is to be appreciated that the developer tools 110 enable a variety of operations to be performed on the shader source code 102 to update the code.

In one or more implementations, the developer tools 110 also enable operations to be performed which affect the shader produced from the shader source code 102, but which are different from updates made directly to the shader source code 102, such as those discussed just above. By way of example, the developer tools 110 also enable compiler flags, build settings, and/or specific API states to be updated without departing from the spirit or scope of the techniques described herein.

In one or more implementations, for instance, the developer tools 110 include one or more tools configured to receive input from a user (e.g., a human user or automated bot) to update API-specific metadata (i.e., a "state") that is taken into account while a compiler compiles a piece of code. In some variations, where the developer tools 110 enable a human user to update API-specific states, the display controller 108 is configured to display such tools via the user interface 112. In addition, such tools enable the specific API states to be updated without updating the shader source code 102 or compiler settings.

It is to be appreciated that the developer tools 110 enable other operations to be performed that affect the shader implemented by the shader source code 102 without departing from the spirit or scope of the described techniques. In accordance with the described techniques, the prediction engine 106 generates performance predictions of the shader responsive to such updates—in addition to responsive to updates to the source code.

Through use of the developer tools 110, the development environment 104 receives a source code update 114, an update that affects the shader as compiled, or an update that affects an API state. Alternatively or additionally, through use of an integrated development environment outside of the development environment 104, the system 100 receives the source code update 114, an update that affects the shader as compiled, or an update that affects the API state. As mentioned above, for instance, a user interacts with the developer tools 110 via the user interface 112 to update the shader source code 102, such that the developer tools 110 remove a line of code, add a line of code, or modify a line of code. As the shader source code 102 is updated, the development environment 104 provides feedback 116. In accordance with the described techniques, for instance, the display controller 108 causes presentation of the feedback 116 via the user interface 112. When displayed via the user interface 112, the feedback 116 includes graphical information, such as information indicating whether the source code update 114 to the shader source code 102 causes performance of the shader to improve or decline. By informing a user regarding whether the source code update 114 causes the performance of the shader to improve or decline, the feedback 116 provides a basis for further updates to the shader source code 102, such as whether to undo the source code update 114, keep the source code update 114 in the shader source code 102, or attempt to introduce additional updates to the shader source code 102.

To the extent that the feedback 116 indicates a performance improvement or decline, it is to be appreciated that the developer tools 110 are used in one or more implementations by an automated "bot" to update the shader source code 102, e.g., without any human-user interaction. Consider an example in which an automated bot utilizes the developer tools 110 to introduce an update (e.g., a random update) to the shader source code 102. For instance, the automated bot determines the update to the shader source code 102 (e.g., to remove a line of code, add a line of code, or modify a line of code) and interacts with the developer tools 110 (e.g., via an application programming interface (API)) to provide the source code update 114. The feedback 116 indicating whether the source code update 114 causes performance of the shader to improve or decline on a target processing unit is then output to the automated bot.

Based on the feedback 116, indicating performance improvement or decline, the automated bot "learns" how to make further updates to the shader source code 102. For instance, parameters of one or more underlying machine learning models which implement the automated bot are adjusted based on the feedback 116, e.g., according to an architecture and/or algorithms used to implement those models. Using reinforcement learning models as an example, the determination of the source code update 114 by the automated bot is positively reinforced (e.g., "rewarded") when the feedback 116 indicates performance improvements and is negatively reinforced (e.g., "penalized") when the feedback 116 indicates performance declines. Certainly, such an automated bot is not limited to implementations that use reinforcement learning models. Rather, various machine learning models are usable to implement an automated bot that leverages the developer tools 110 to update the shader source code 102 and produce a shader that is optimized.

In accordance with the described techniques, the feedback 116 includes or is otherwise based on predictions generated by the prediction engine 106. As input, the prediction engine 106 receives a shader representation 118 of the shader derived from the shader source code 102. Examples of the shader representation 118 include, but are not limited to, an intermediate language produced by a compiler that compiles the shader source code 102 (e.g., by compiling the source code from a high-level language), machine-level code, a control-flow graph, and other components, such as a live register analysis of the shader, and data flow graph of the shader. Accordingly, in one or more implementations, the shader representation 118 is an intermediate representation that comprises one or more of the intermediate language, the machine-level code, a control-flow graph, or the other components (or a combination of any one or more of them). Alternatively or in addition, the prediction engine 106 receives as input a shader representation 118 configured differently from the forms mentioned just above without departing from the spirit or scope of the described techniques. In one or more implementations, the shader representation 118 captures updates to additional and/or different aspects for implementing the shader, such as updates to compiler flags, build settings, and/or specific API states.

The prediction engine 106 generates a prediction 120 about performance of the shader based on the shader representation 118. In this way, the prediction engine 106 generates the prediction 120 about the shader or a pipeline of shaders statically from the shader source code 102 without running the shader or the pipeline of shaders, e.g., without running a shader and measuring its performance using a simulation or on the actual hardware for which the shader is developed and compiled. Thus, the prediction engine 106 generates a prediction about performance of the shader implemented by the shader source code 102 without running the code, without profiling the code, and without emulating execution of the code. Instead, the prediction engine 106 generates the prediction 120 using one or more machine learning models, as discussed in more detail in relation to FIG. 2. Notably, the prediction engine also takes into account (if applicable) the accompanying compiler settings or API-specific state when generating the prediction 120.

Alternatively or in addition, the prediction engine 106 generates the prediction 120 about performance of pipeline state objects based on one or more representations of them, e.g., generates a prediction about performance of each pipeline state object of a pipeline. In accordance with the described techniques, the prediction engine 106 generates this prediction about the performance of the pipeline state objects without running corresponding source code, without profiling the code, and without emulating execution of the code. Instead, the prediction engine generates the prediction 120 using one or more machine learning models.

By generating the prediction 120 without running the code, without profiling the code, and without emulating execution of the code, the prediction engine 106 eliminates obstacles that arise in connection with optimizing shaders by updating their source code. In particular, the prediction engine 106 eliminates the need to run the shader on an actual processing unit (hardware) for which the shader is coded and compiled. Because the shader need not be run on the actual processing unit, a developer or entity optimizing the shader does not need to purchase or otherwise access the hardware. When the development environment 104 enables the shader source code 102 to be compiled for multiple processing units (e.g., a family of processing units from a particular entity or processing units of a comparable class from different entities), the developer or entity is able to optimize the shader without purchasing or otherwise accessing the multiple processing units.

In accordance with the described techniques, the prediction engine 106 generates the prediction 120 of performance of the shader (implemented by the shader source code 102) for one or more processing units. By way of example, the prediction engine 106 generates the prediction 120 as one or more estimated statistics that describe a distribution of a performance metric of the shader on the one or more processing units, e.g., an estimated mean and/or an estimated variance of the performance metric. Alternatively or in addition, the prediction engine 106 generates the prediction 120 as an estimate of a trend, e.g., an estimate of performance change of the shader between the shader source code 102 before the source code update 114 and after the source code update 114. As described in more detail below, the estimate of the performance change may indicate a direction of the performance change (e.g., an improvement or a decline in performance) and/or an amount of the performance change (e.g., a percentage improvement or an improvement in absolute time such as microseconds and nanoseconds). In the context of generating the prediction 120, consider the following discussion of FIG. 2.

Figure 2:
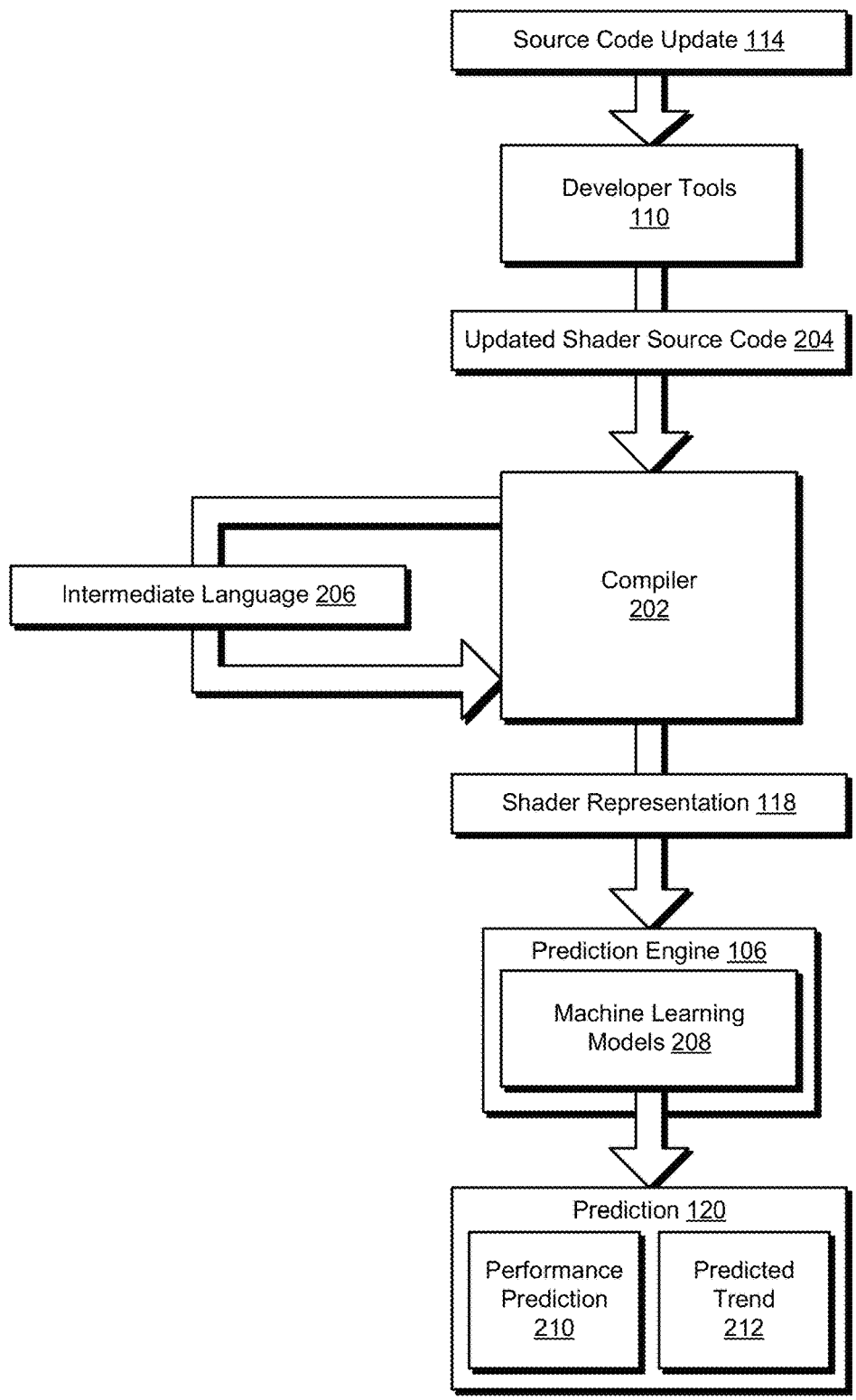
FIG. 2 depicts a non-limiting example in which a prediction engine uses machine learning models to generate predictions of performance of a shader from source code for implementing the shader.

FIG. 2 depicts a non-limiting example 200 in which a prediction engine uses machine learning models to generate predictions of performance of a shader from source code for implementing the shader. Example 200 includes from FIG. 1 the developer tools 110 and the prediction engine 106. The illustrated example 200 also includes compiler 202. The compiler 202 receives updated shader source code 204, which is updated based on receipt of the source code update 114 made using the developer tools 110. In one or more implementations, the updated shader source code 204 corresponds to the shader source code 102 with the source code update 114, as depicted in FIG. 1. For example, when the source code update 114 removes a line of code, the updated shader source code 204 corresponds to the shader source code 102 with the line of code removed. It is to be appreciated that the compiler 202 is also capable of compiling the shader source code 102 prior to a source code update, e.g., to serve as a baseline implementation of the shader. The compiler 202 is also capable of compiling the shader source code 102 based on other updates that affect the shader, such as updates to compiler flags, build settings, and/or API-specific states.

The compiler 202 compiles the updated shader source code 204. In one or more implementations, the compiler 202 compiles the updated shader source code 204 based on a selection to compile the source code, e.g., a selection received via the user interface 112. Alternatively or additionally, the compiler 202 compiles the updated shader source code 204 as source code updates 114 are received. For example, responsive to user input via the user interface 112 to remove, add, or modify a line of the shader source code 102, the compiler 202 automatically compiles the updated shader source code 204, e.g., in real time. By "automatically" it is meant that the compiler 202 compiles the updated shader source code 204 without user input expressly selecting to compile the shader source code 102.

In response, the prediction engine 106 generates the predictions 120, and the display controller 108 provides the feedback 116 about shader performance, as the source code updates 114 are made to the shader source code 102. Alternatively or additionally, the compiler 202 compiles the updated shader source code 204 at an interval of time, e.g., every 5 seconds. It is to be appreciated that the compiler 202 compiles the updated shader source code 204 in various implementations according to other bases without departing from the spirit or scope of the techniques described herein, such as responsive to a selection to save updates to the source code, responsive to user input to "check-in" the code to a code repository, or responsive to occurrence of a different predefined event.

In example 200, the compiler 202 compiles the updated shader source code 204, which corresponds to a high-level language in one or more implementations, by processing it to generate an intermediate language 206 representation of the shader. Examples of the intermediate language 206 include, but are not limited to, Standard Portable Intermediate Representation (SPIR and SPIR-V) and DirectX Intermediate Language (DXIL). The compiler 202 then compiles the updated shader source code 204 into an intermediate representation. In one or more implementations, the shader representation 118 corresponds to the intermediate representation as mentioned above.

The shader representation 118 is fed into the prediction engine 106. In accordance with the described techniques, the prediction engine 106 includes machine learning models 208 that generate the prediction 120 of performance of the shader on at least one processing unit. By using the machine learning models 208, the prediction engine 106 eliminates the need to run the shader (on the actual processing units or using a simulation of those processing units) and measure performance of the shader as run. In one or more implementations, the prediction engine 106 pre-processes the shader representation 118 to produce data for input to the machine learning models 208. By way of example, the prediction engine 106 converts a shader representation 118, corresponding to executable code in a text or byte format, into a different format that is suitable for input to one or more machine learning models, such as into one or more vectors (e.g., that are representative of the executable code in the text or byte format).

In accordance with the described techniques, the machine learning models 208 are trained prior to generating the prediction 120, e.g., the machine learning models 208 are trained prior to their deployment as part of the prediction engine 106. By way of example, the machine learning models 208 are trained using historical data describing performance of other shaders (e.g., shaders different from the shader implemented with the shader source code 102) on one or more processing units.

The one or more processing units relative to which the historical data is collected for such training correspond to the one or more processing units for which the machine learning models 208 generate the prediction 120. Accordingly, the machine learning models 208 generate the prediction 120 for particular processing units for which those models have been trained. In one or more implementations, the machine learning models 208 are trained using data describing shader performance on multiple processing units. For example, the machine learning models 208 are trained using historical data describing shader performance on a family of processing units from a particular entity or are trained using historical data describing shader performance on processing units of a comparable class from different entities (e.g., flagship processing units of the different entities).

By training the machine learning models 208 with data for multiple processing units, the machine learning models 208 are able to predict the performance of a shader on each of those multiple processing units and do so without actually running the shader on those processing units or using a simulation of those processing units, which is done by conventional techniques. Generating predictions about shader performance using the machine learning models 208 provides feedback about the performance of shaders faster than running the shaders on the actual processing units or in simulations and measuring their performance. Moreover, using the predictions rather than actual performance measurements allows the system to generate and output the feedback 116 via the user interface 112 in real-time (or near real-time) to guide a user to optimize the shader, as updates to the code are received. Conventional techniques that involve running a shader (e.g., on a processing unit or in a simulation) and measuring performance of the shader are not capable of providing real-time or even near real-time feedback. This is because the runtime of shaders and collection of information introduce too much lag to enable real-time feedback to be provided.

In one or more implementations, the machine learning models 208 are supervised machine learning models, e.g., trained using one or more supervised learning techniques. For example, the machine learning models 208 are trained using classification techniques or regression techniques. In addition or alternatively, the machine learning models 208 receive a shader representation as input during training. This received shader representation corresponds to a shader that has actually been run on a processing unit for which the models are being trained or has been run in a simulation involving that processing unit. Moreover, the performance of this training shader, as run on the processing unit or in the simulation, has been measured. Responsive to receipt of the shader representation as input, the machine learning models 208 generate a prediction of performance of the training shader on the processing unit by processing the representation of the training shader. The machine learning models 208 provide this prediction of performance as training output.

Once output, the predicted performance of the shader is compared to the measured performance of the shader on the actual processing unit or in the simulation. For example, the prediction of performance is compared to the shader's measured performance using a loss function. Based on the comparison, one or more parameters of the machine learning model 208 are adjusted, e.g., according to an optimization algorithm such as gradient descent. When the machine learning models 208 include a neural network, for example, internal weights of nodes of the neural network are adjusted based on the comparison. The machine learning models 208 continue to be trained (e.g., by iteratively receiving a shader representation as input, predicting the shader's performance, and having parameters adjusted based on a comparison to measured performance) until the training predictions satisfy a threshold, e.g., when differences between the training predictions generated by the machine learning models 208 and the measured performance of the shaders are within some threshold amount of error.

It is to be appreciated that in one or more implementations, the machine learning models 208 include a single model trained using historical data that describes performance of shaders on at least two different processing units. Alternatively or additionally, the machine learning models 208 correspond to a single model trained using historical data that describes performance of shaders on a single processing unit. Alternatively or additionally, the machine learning models 208 include at least two models, where each model is trained using historical data describing performance of shaders on a respective processing unit, such that in operation each model generates performance predictions for a respective processing unit, but because there are multiple models, predictions for performance on multiple processing units are generated. In such implementations, the machine learning models 208 correspond to an ensemble of models.

Although supervised training of models is discussed above, in one or more implementations, the machine learning models 208 include or are otherwise implemented using different types of models, such as unsupervised models. Additionally, the machine learning models 208 include models trained in different ways (e.g., at least one model trained using a supervised training technique and at least one different model trained using an unsupervised training technique) and/or having different architectures in one or more implementations. Accordingly, the above discussion should not be seen to limit the types of models included in the machine learning models 208 or the particular training techniques used to train those models.

Here, the machine learning models 208 are depicted outputting two types of predictions 120, which include performance prediction 210 and predicted trend 212. In one or more implementations, the machine learning models 208 are configured to output just one type of prediction 120, e.g., the performance prediction 210 or the predicted trend 212. Alternatively or additionally, the machine learning models 208 are configured to output both types of predictions 120, e.g., both the performance prediction 210 and the predicted trend 212. It should be appreciated that the machine learning models 208 are trained in further implementations to output various types of predictions (in addition to and/or instead of one or more of those mentioned just above) without departing from the spirit or scope of the techniques described herein.

In one or more examples, the performance prediction 210 estimates a distribution of a performance metric of the shader. An example of the performance metric is execution time of the shader, although other metrics are contemplated in the spirit and scope of the described techniques. In one or more implementations, for example, the performance prediction 210 includes one or more statistics that parameterize the distribution of the performance metric. Examples of a statistic that parameterizes the distribution include but are not limited to average (e.g., mean), variance, and standard deviation. Alternatively or additionally, the performance prediction 210 is configured to estimate the distribution in the form of an estimated position of the performance metric in a probability distribution, such as in some variations where the prediction engine 106 receives information about the probability distribution. Examples of information about the probability distribution include, but are not limited to, confidence intervals for a resolution and a cumulative distribution function. In one or more other examples, the performance prediction 210 estimates an absolute prediction of performance instead of a distribution of performance.

The performance prediction 210 is generated by the machine learning model 208 from a version of source code at a particular time. By way of example, the machine learning models 208 generate the performance prediction 210 for a shader implemented by the shader source code 102, and generate a separate performance prediction 210 for a shader implemented by the updated shader source code 204, which corresponds to the shader source code 102 with the source code update 114. It is to be appreciated, therefore, that the shader implemented by the shader source code 102 corresponds to a different version of the shader (e.g., an older version) than the shader implemented by the updated shader source code 204.

In accordance with the described techniques, the predicted trend 212 compares a first predicted performance of a shader implemented by a first version of source code to at least a second performance of a shader implemented by at least a second version of the source code. As an example, the first version of source code corresponds to the shader source code 102 prior to the source code update 114 and the second version of source code corresponds to the shader source code 102 after the source code update 114, i.e., the updated shader source code 204.

Thus, the predicted trend 212 is a relative prediction in which the machine learning models 208 predict a difference in shader performance after a source code update 114. This difference in shader performance thus represents an effect of the source code update 114 on the shader performance relative to a previous version of the source code. An example of this difference is a percentage change in the predicted performance, such as a percentage improvement of the shader's performance relative to a previous version of the source code or a percentage decline of the shader's performance relative to the previous version of the source code. In one or more implementations, an improvement in performance is indicated by displaying one or more graphical indicators in the user interface 112, such as a negative percentage ('−') indicating a beneficial reduction of the performance metric (e.g., runtime), a first color (e.g., green), or other visual emphases. Similarly, a decline in performance is indicated by one or more graphical indicators in the user interface 112, such as a positive percentage ('+') indicating a detrimental increase of the performance metric (e.g., runtime), a second color (e.g., red), or other visual emphases. By displaying the predicted trend 212 via the user interface 112, the development environment 104 guides a user in a code optimization process, by informing the user whether the source code updates 114 are predicted to cause performance of the shader implemented by the source code to improve or decline.

In one or more implementations, and as mentioned above, the machine learning models 208 generate the predictions 120 of performance as statistics describing distributions of a performance metric rather than predict the metric itself. By way of example, the machine learning models 208 generate the predictions 120 of performance by outputting one or more of parameterizations describing the performance metric—such as predicted average (e.g., mean), variance, and/or standard deviation of the performance metric—rather than by predicting the performance metric.

In one or more implementations, for instance, the performance metric corresponds to an execution time of the shader to perform an operation for the processing unit. In such implementations, the machine learning models 208 thus generate the predictions 120 to include one or more of predicted mean execution time, predicted variance of the execution time, and/or predicted standard deviation of the execution time to describe a distribution of the execution time. It is to be appreciated that in one or more implementations, the machine learning models 208 generate the predictions in terms of performance metrics that are different from execution time and by parameterizing the performance metric in different ways from mean, variance, and standard deviation without departing from the spirit or scope of the techniques.

By generating the predictions 120 in terms of parameterizations describing distributions of a performance metric rather than predicting the actual performance metric (e.g., execution time), the machine learning models 208 generate more informative predictions of a shader's performance than conventional techniques. For example, while the conventional process of running and measuring performance on real hardware may be "accurate," it does not provide a holistic picture of the expected results. This is because the shader will ultimately be run on a specific system, with a specific load (e.g., other apps running at the same time) with specific peripherals (e.g., memory). Thus, unlike conventional systems, the prediction 120 takes into account different configurations and gives either a distribution or an absolute prediction that allows the developer to make a more informative decision.

Notably, this reflects the environment and conditions under which shaders are run on processing units in the real world. By way of example, a state of an application (e.g., a video game) calling on the processing unit to perform an operation, such as to render a scene via the rendering pipeline, is capable of differing widely from call to call. Consequently, parameters passed to the processing unit to perform the operation are capable of differing widely, e.g., depending at least on the state of the application. Moreover, different combinations of parameters involve using different combinations of shaders and depend on availability of hardware resources at a time of a call, such that the availability affects which resources are used to carry out operations. Thus, although a shader is used by a processing unit to perform operations in a variety of scenarios in the real world, a given scenario in which a shader is used is rarely, if ever, exactly the same as another, e.g., in terms of application state and/or usage of other hardware resources. Given this, generating the predictions 120 as parameterizations, describing distributions of a performance metric, effectively covers a variety of application states and resource usage and accurately reflects the real-world operation of shaders as run on processing units.

In one or more implementations, the machine learning models 208 generate the performance prediction 210 and the predicted trend 212 for each basic block of the shader. Alternatively or additionally, the machine learning models 208 generate the performance prediction 210 and the predicted trend 212 for each instruction of the shader. The prediction engine 106 then aggregates the predictions 120 generated by the machine learning models 208 so that performance of the shader, as a whole, is predicted. When the predictions 120 are generated by the machine learning models 208 at the instruction level, for instance, the prediction engine 106 aggregates the predictions for the instructions of a given block. In one or more examples, the prediction engine 106 aggregates the predictions by summing those predictions. In other examples, the prediction engine 106 aggregates the predictions by determining the average, median, maximum value, or minimum value of the predictions. The prediction engine 106 thus computes the prediction for each block of the shader by aggregating the predictions generated for the respective block's instructions. Similarly, when the predictions are generated by the machine learning models 208 at the block level, the prediction engine 106 aggregates the predictions for the different blocks of the shader, e.g., the prediction engine 106 sums those predictions. The prediction engine 106 thus computes the prediction for performance of the shader by aggregating the predictions generated for the different blocks of the shader.

The prediction engine 106 is capable of aggregating such predictions as mentioned above because as a shader executes, it follows a control flow graph (CFG), which executes each basic block in the shader according to the defined control flow. In this way, the execution of a shader corresponds to an aggregation of the execution of the shader's basic blocks, which is defined by the following equation, in one or more implementations.

$$t_s = \text{aggregate}(t_b i) \forall b_i \in B_s$$

Here, the term $b^i$ represents a given basic block and the term $t_s$ represents the execution time of a shader, which is represented by the term s. Further, the term $t_b i$ represents the execution time of a given basic block $b^i$, and the term $B_s$ represents the set of all basic blocks of the shader s. The term 'aggregate( )' represents an aggregation function, such as a total sum. It should be appreciated that in various implementations the prediction engine 106 aggregates predictions for levels of abstraction of a shader that are different from instructions and blocks without departing from the spirit or the scope of the described techniques. In the context of incorporation of the predictions 120 into the feedback 116 provided via the user interface 112, consider the following discussion of FIGS. 3-6, in accordance with the described techniques.

Figure 3:
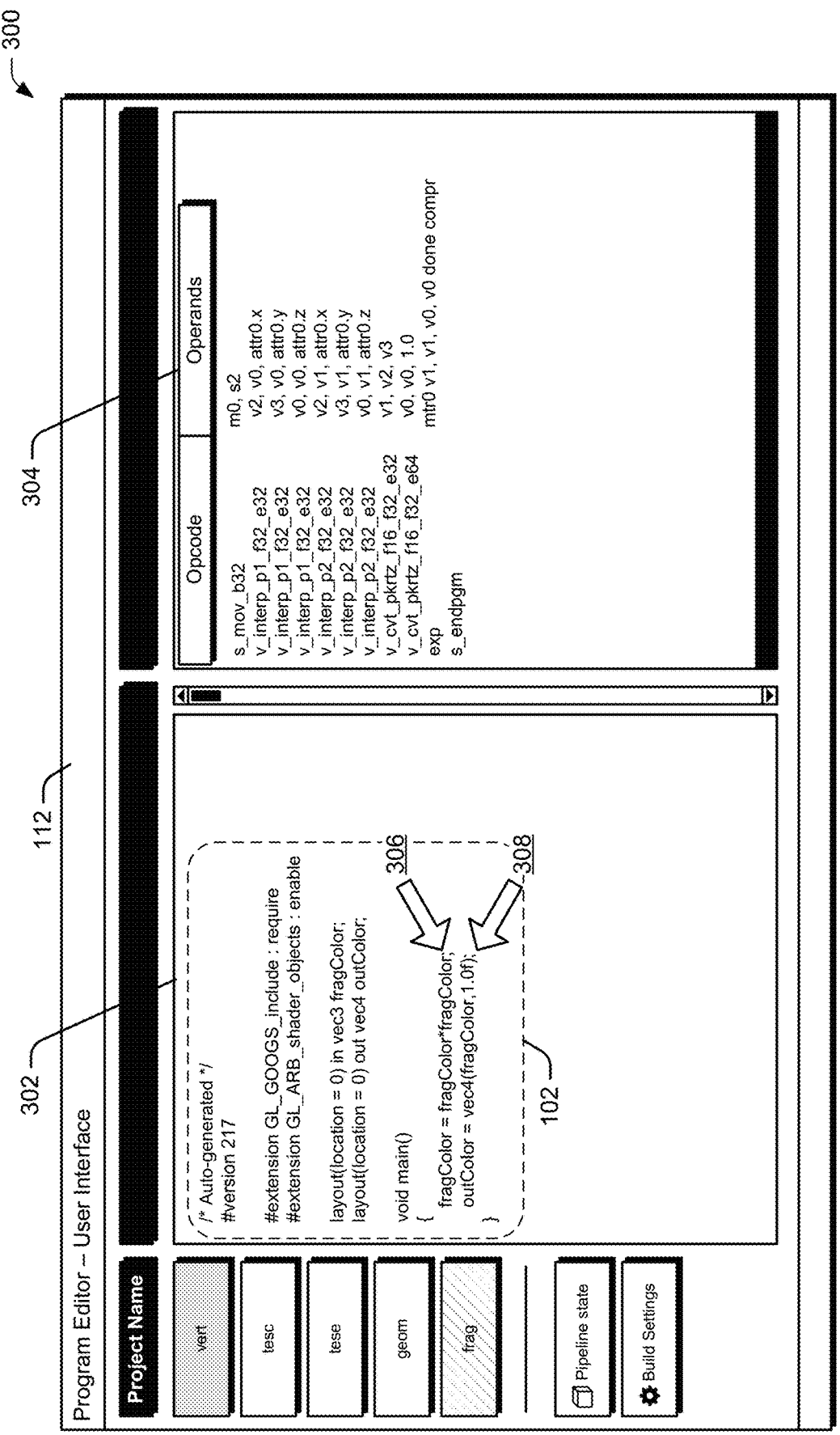
FIG. 3 depicts a non-limiting example of a user interface of a development environment that is used to update source code for implementing a shader.

FIG. 3 depicts a non-limiting example 300 of a user interface of a development environment that is used to update source code for implementing a shader. Example 300 includes from FIG. 1 the user interface 112 of the development environment 104.

In this example 300, the user interface 112 includes a first portion 302 and a second portion 304. In various implementations, the user interface 112 includes different numbers of portions to facilitate updating the shader source code 102. Certainly, the user interface 112 of the development environment 104 should not be seen as limited to the following illustrated examples or to the following description. Instead, the user interface 112 of the development environment 104 is configurable in various ways in accordance with the described techniques.

Here, the first portion 302 displays an example of source code, e.g., the shader source code 102. By way of example, the displayed source code includes both line 306 and line 308 of code (among others). In one or more implementations, the first portion 302 corresponds to one of the developer tools 110, such as a source code editor which allows a user to provide inputs to update source code. As mentioned above and below, examples of updates to the source code include but are not limited to addition of lines of code, removal of lines of code, and modification (e.g., of characters) within lines of code. In this example 300, the second portion 304 displays additional information related to the shader source code 102, e.g., compiled code (machine-level instructions or intermediate representation) of the shader corresponding to the shader source code 102. In accordance with the described techniques, the second portion 304 corresponds to a second tool of the developer tools 110 and facilitates development and optimization of shaders. In one or more implementations, the second portion 304 displays different information. Alternatively or in addition, the second portion 304 is not displayed in some variations, e.g., while updating source code in the first portion 302.

In the example represented across FIGS. 3-6, the illustrated example 300 represents a first stage, such as a stage in which the display controller 108 causes display of the shader source code 102 via the user interface 112 and which is prior to receiving the source code update 114. In the context of receiving the source code update 114, consider the following discussion of FIG. 4.

Figure 4:
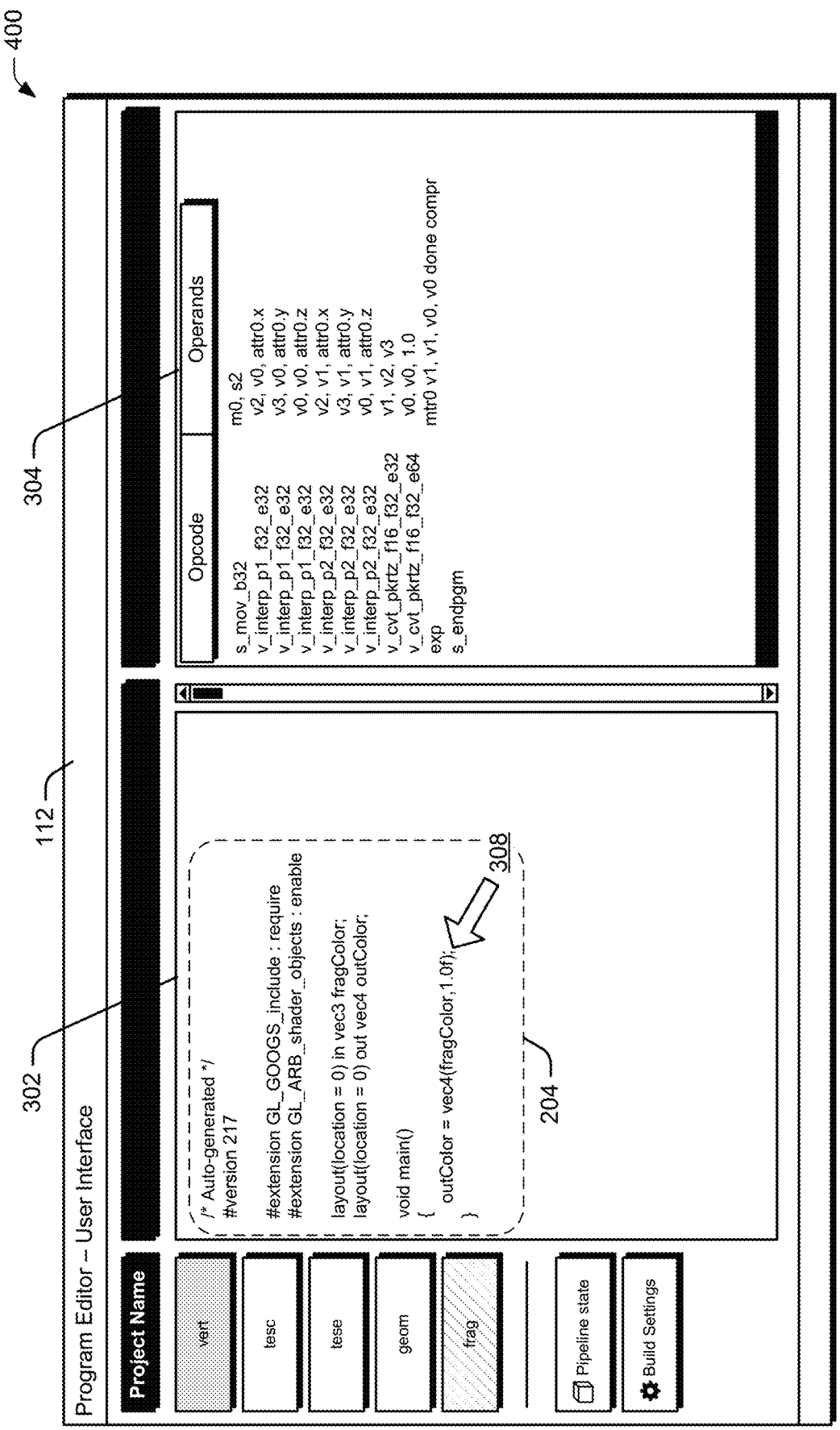
FIG. 4 depicts a non-limiting example in which the user interface of the development environment displays an update to the source code for implementing the shader.

FIG. 4 depicts a non-limiting example 400 in which the user interface of the development environment displays an update to the source code for implementing the shader. In particular, the example 400 includes the user interface 112 having the first portion 302 and the second portion 304, as depicted in FIG. 3.

In contrast to the example 300 depicted in FIG. 3 though, the first portion 302 displays the line 308 of source code but not the line 306 of source code. This represents a scenario in which the shader source code 102 is updated via the development tools 110, e.g., to remove the line 306 of source code. Removal of the line 306 of source code corresponds to the source code update 114 in this scenario. Based on the source code update 114 (e.g., removal of the line 306 of source code), the developer tools 110 produce the updated shader source code 204. A mentioned above and below, the developer tools 110 enable updates to be made to shader source code in various ways without departing from the spirit or scope of the described techniques. An example of the updated shader source code 204 is depicted in the first portion 302 in this example 400. In the context of feedback provided responsive to receiving the source code update 114, consider the following discussion of FIG. 5.

Figure 5:
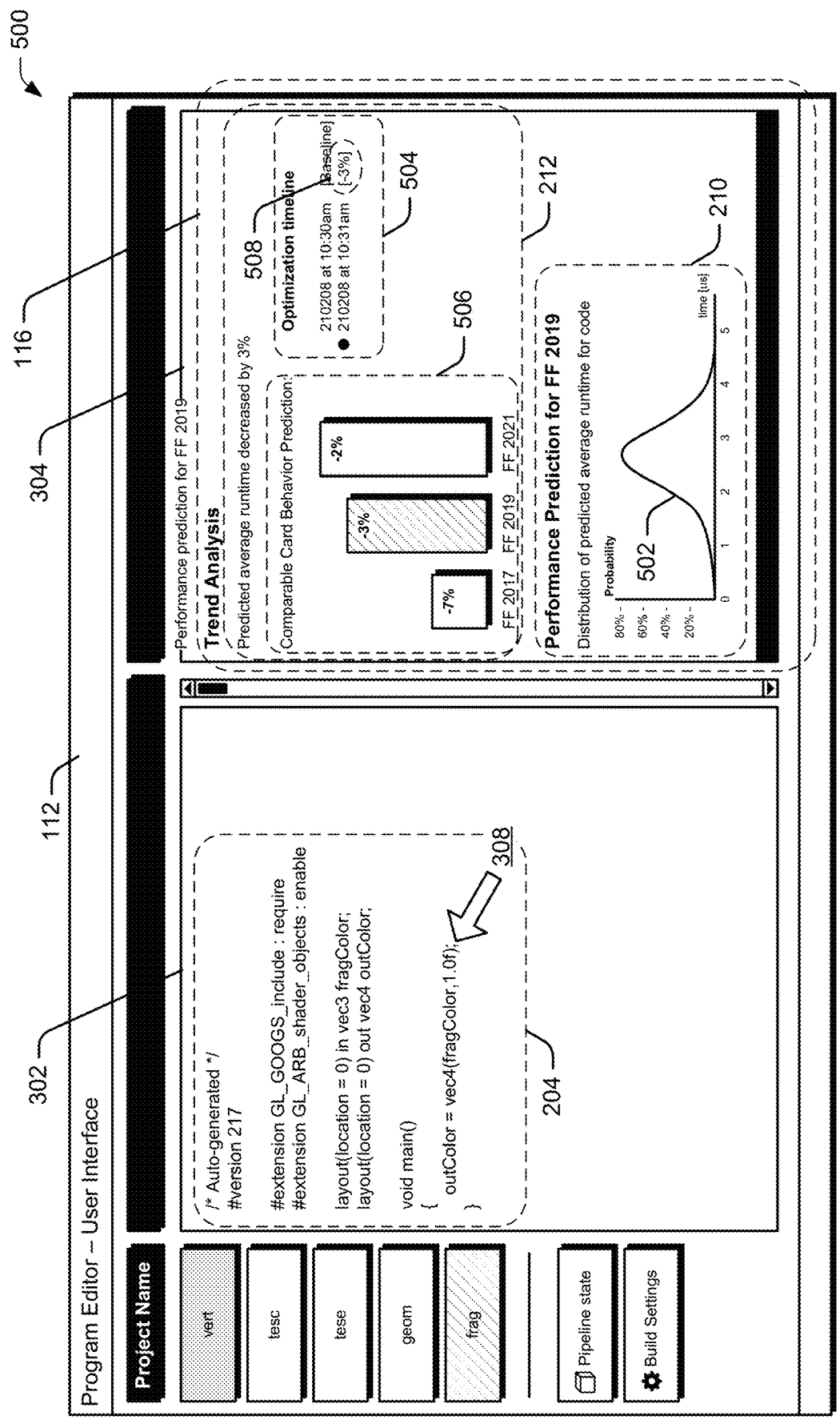
FIG. 5 depicts a non-limiting example in which the user interface of the development environment displays feedback about predicted performance of the shader based on the update to the source code.

FIG. 5 depicts a non-limiting example 500 in which the user interface of the development environment displays feedback about predicted performance of the shader based on the update to the source code. The example 500 includes from FIG. 4 the user interface 112 having the first portion 302 and the second portion 304, where the first portion 302 displays the updated shader source code 204 which includes the line 308 of source code but not the line 306 of source code, e.g., based on receiving the source code update 114.

In contrast to FIG. 4 though, the second portion 304 is updated to display the feedback 116 to the source code update 114. By way of example, the display controller 108 causes the user interface 112 to display the feedback 116 about predicted performance of the corresponding shader responsive to the source code update 114. In one or more implementations, the display controller 108 causes the user interface 112 to display the feedback 116 to shader source code updates in substantially real time as those updates are received. In this way, the feedback 116 helps developers make updates that optimize performance of the shader implemented by the source code.

Here, the feedback 116 displayed via the user interface 112 includes the performance prediction 210 and the predicted trend 212. One example of presenting the performance prediction 210 as part of the feedback 116 includes displaying a performance graphic 502, such as a distribution of a performance metric, as predicted for a shader implemented using the updated shader source code 204.

Examples of presenting the predicted trend 212 as part of the feedback 116 include displaying an optimization timeline 504 and displaying a comparison graphic 506. In one or more implementations, the optimization timeline 504 indicates a trend 508 in predicted performance of a shader relative to a predicted performance prior to the source code update 114. Here, the optimization timeline 504 indicates a trend 508 relative to a baseline version of the source code, e.g., '−3%' which corresponds to a predicted decrease in runtime (an improvement of the shader relative to the previous version). In the illustrated example 500, the comparison graphic 506 compares predicted performance of shaders implemented by the updated shader source code 204 for different processing units, e.g., on a first processing unit ('FF 2017'), a second processing unit ('FF 2019'), and a third processing unit ('FF 2021'). Notably, the feedback 116 with the predictions 120 (e.g., the performance prediction 210 and the predicted trend 212) is displayed concurrently with the updated shader source code 204.

Figure 6:
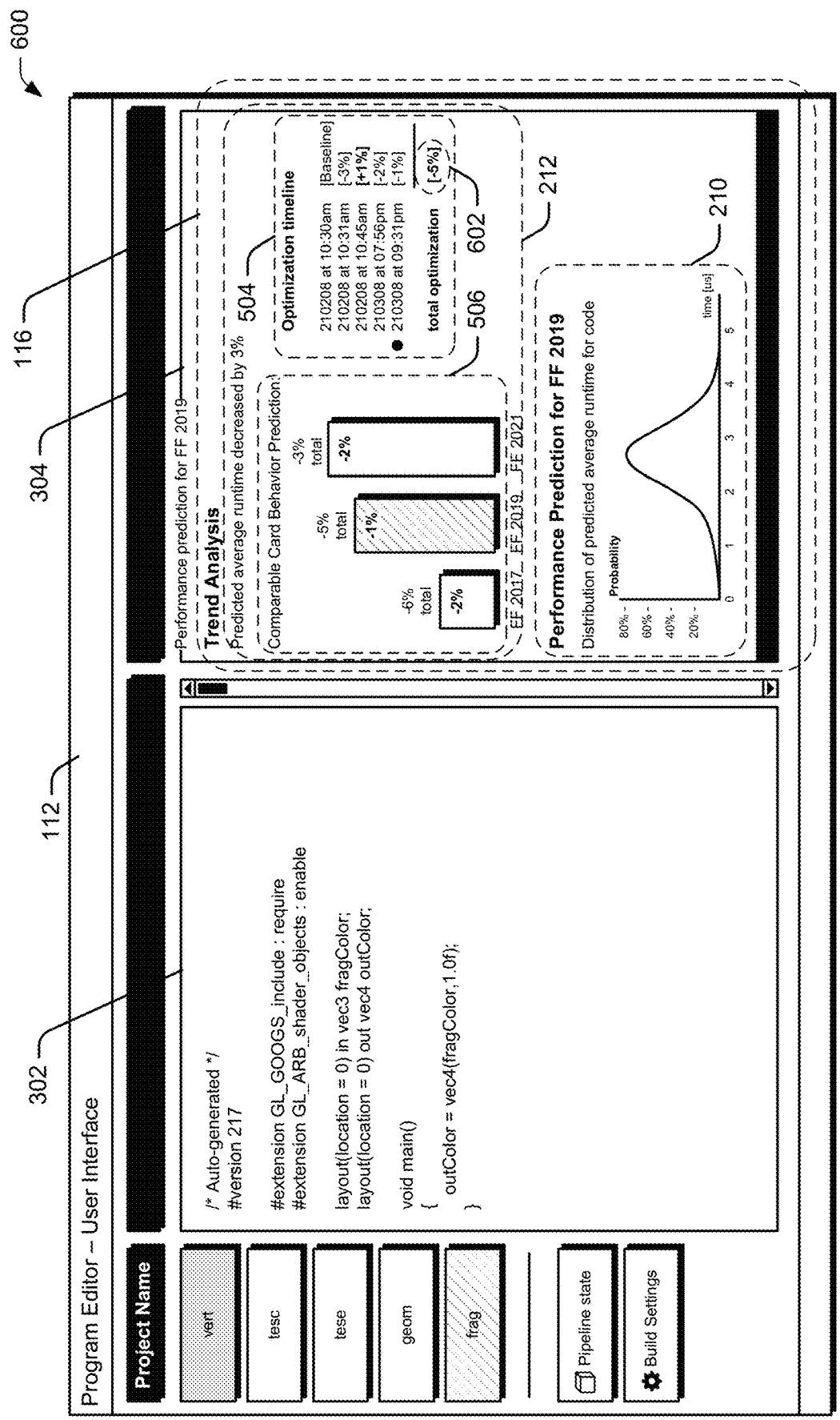
FIG. 6 depicts a non-limiting example in which the user interface of the development environment is updated to display feedback about predicted performance of the shader based on additional updates to the source code.

FIG. 6 depicts a non-limiting example 600 in which the user interface of the development environment is updated to display feedback about predicted performance of the shader based on additional updates to the source code.

The example 600 also includes the user interface 112 having the first portion 302 and the second portion 304. Further, the second portion 304 displays the feedback 116. Here, the feedback 116 displayed via the user interface 112 includes the performance prediction 210 and the predicted trend 212, including the optimization timeline 504. In contrast to the optimization timeline 504 depicted in the previous example 500, the optimization timeline 504 in this example 600 includes trends for more than one source code update 114. In particular, this example 600 illustrates a scenario in which at least four updates are made to the shader source code. Each update referenced in the optimization timeline 504 includes a trend relative to a previous version of the source code, e.g., relative to the source code prior to receiving at least one respective source code update.

Further, the optimization timeline 504 includes a total optimization 602, which represents a performance trend across all the updates to the source code, e.g., a predicted trend between a baseline version of the shader source code and a most recent version of the shader source code. The comparison graphic 506 also includes total optimizations for the different processing units. Thus, the comparison graphic 506 concurrently presents a trend relative to a previous version of source code (e.g., within each bar of the graphic) and a trend relative to a baseline version of the source code (e.g., above each bar of the graphic). It is to be appreciated that the user interface 112 is configurable in a variety of ways to present the feedback 116, including one or more of the predictions 120, in accordance with the described techniques.

Figure 7:
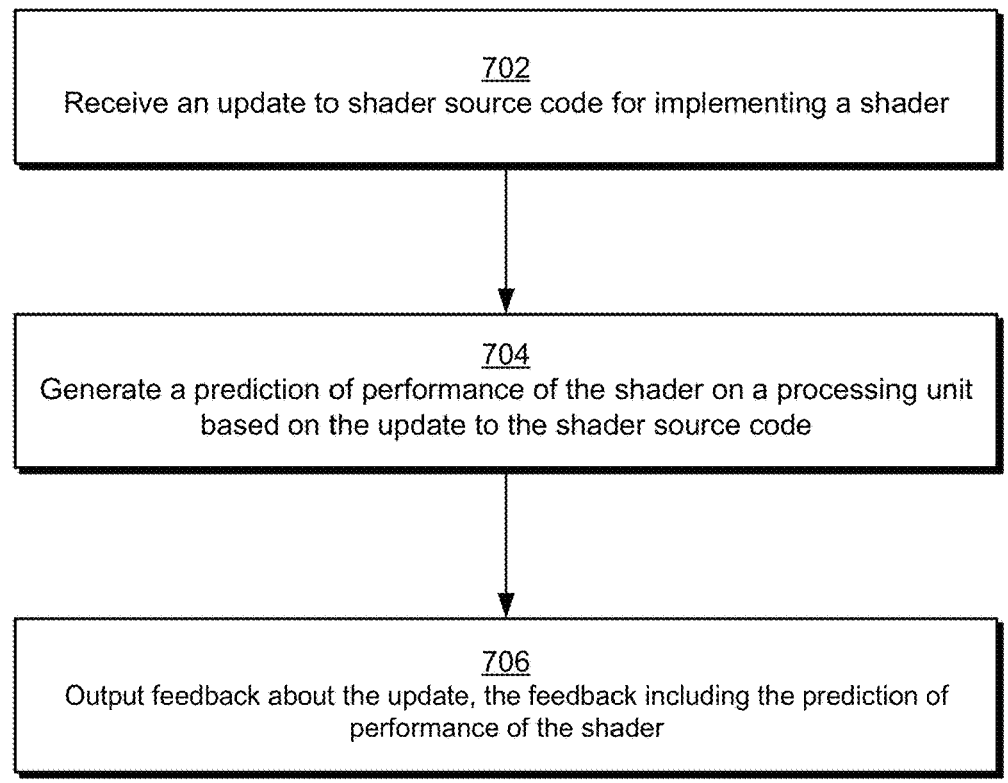
FIG. 7 depicts a procedure in an example implementation of outputting feedback to an update to shader source code.

FIG. 7 depicts a procedure 700 in an example implementation of outputting feedback to an update to shader source code.

An update to shader source code for implementing a shader is received (block 702). By way of example, through use of the developer tools 110, development environment 104 receives a source code update 114. In one or more examples, a user interacts with the developer tools 110 via the user interface 112 to update the shader source code 102, such that the developer tools 110 remove a line of code, add a line of code, or modify a line of code. In other examples, an automated bot updates the shader source code 102, e.g., without any human-user interaction.

A prediction of performance of the shader on a processing unit is generated based on the update to the shader source code (block 704). By way of example, prediction engine 106 generates prediction 120 of performance of the shader (implemented by the shader source code 102) for one or more processing units. In one or more implementations, prediction engine 106 includes machine learning models 208 that generate the prediction 120 of performance of the shader on at least one processing unit. By using the machine learning models 208, the prediction engine 106 eliminates the need to run the shader (on the actual processing units or in a simulation of those processing units) and measure performance of the shader as run.

Feedback about the update is output (block 706). In accordance with the principles discussed herein, the feedback includes the prediction of performance of the shader. In one or more examples, display controller 108 causes presentation of feedback 116 via the user interface 112. The feedback 116 includes the prediction 120 about the performance of the shader. When displayed via the user interface 112, the feedback 116 includes graphical information, such as information indicating whether the source code update 114 to the shader source code 102 causes performance of the shader to improve or decline. By informing a user regarding whether the source code update 114 causes the performance of the shader to improve or decline, the feedback 116 provides a basis for further updates to the shader source code 102, such as whether to undo the source code update 114, keep the source code update 114 in the shader source code 102, or attempt to introduce additional updates to the shader source code 102. In other examples, the feedback 116 is output to the automated bot.

Figure 8:
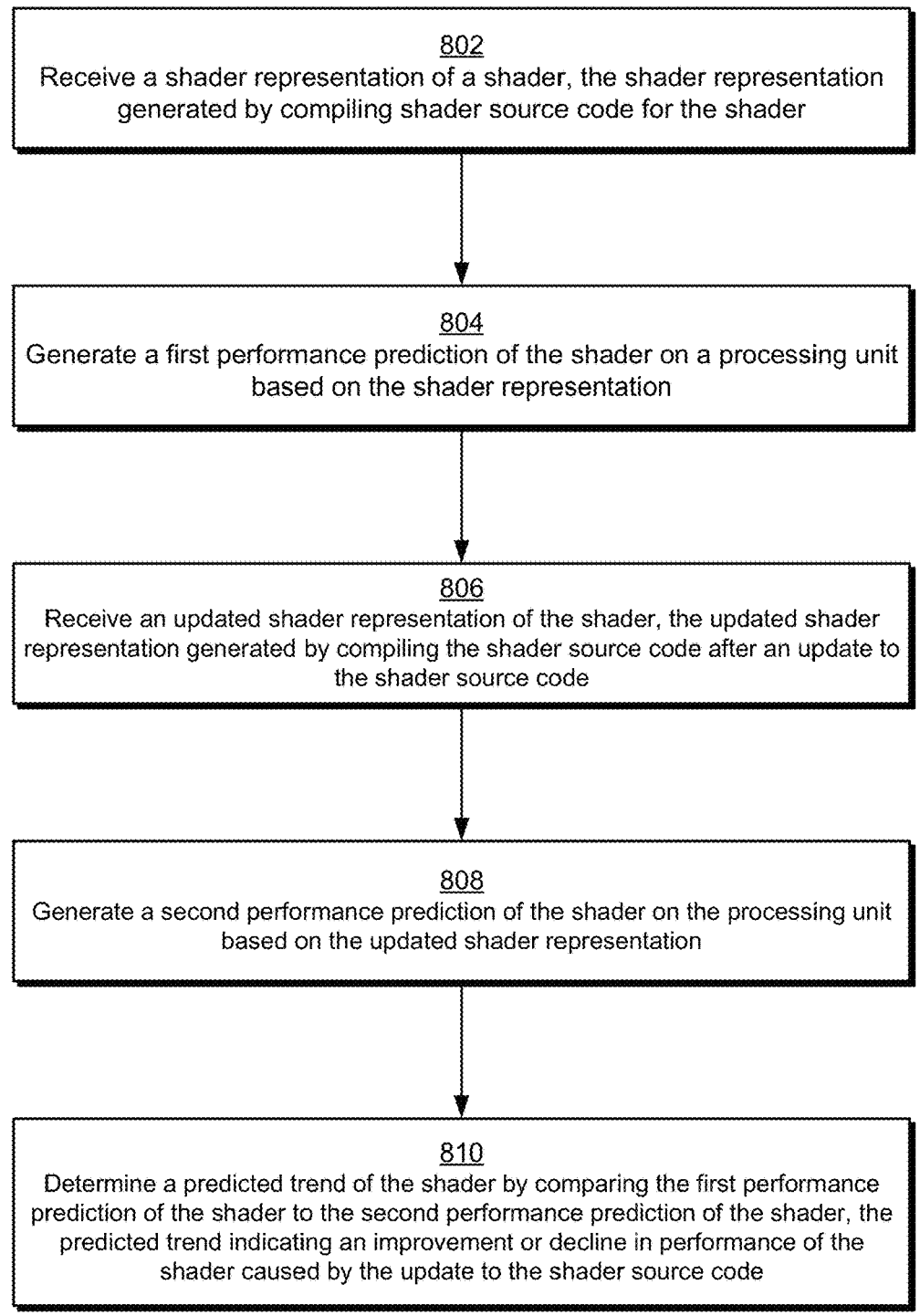
FIG. 8 depicts a procedure in an example implementation of generating predictions of performance of a shader.

FIG. 8 depicts a procedure 800 in an example implementation of generating predictions of performance of a shader.

A shader representation of a shader implemented by shader source code is received (block 802). In accordance with the principles discussed herein, the shader representation is generated by compiling the shader source code. By way of example, prediction engine 106 receives shader representation 118 of a shader implemented by shader source code. The shader representation 118 is generated by compiler 202 which compiles the shader source code to generate the shader representation 118. The shader source code compiled by the compiler 202 to generate the shader representation 118, in some cases, corresponds to updated shader source code 204. Alternately, the shader representation received at block 802 by the prediction engine 106 corresponds to a first version (e.g., a baseline version) of shader source code compiled by the compiler 202.

A first performance prediction of the shader on a processing unit is generated based on the shader representation (block 804). By way of example, prediction engine 106 generates a first performance prediction 210 of the shader (implemented by the shader source code 102) on a processing unit. In one or more implementations, prediction engine 106 includes machine learning models 208 that generate the first performance prediction 210 of the shader on the processing unit. By using the machine learning models 208, the prediction engine 106 eliminates the need to run the shader (on the actual processing units or in a simulation of those processing units) and measure performance of the shader as run. In accordance with the described techniques, the performance prediction 210 estimates a distribution of a performance metric of the shader. An example of the performance metric is execution time of the shader, although other metrics are contemplated in the spirit and scope of the described techniques.

An updated shader representation of the shader implemented by the shader source code is received (block 806). In accordance with the principles discussed herein, the updated shader representation is generated by compiling the shader source code after an update to the shader source code. By way of example, prediction engine 106 receives shader representation 118 of a shader implemented by shader source code. The shader representation 118 is generated by compiler 202 which compiles the updated shader source code 204 to generate the shader representation 118. Thus, the shader representation 118 received at block 806 is generated based on source code that has been updated as compared to the version of the source code compiled to generate the shader representation 118 that is received at block 802.

A second performance prediction of the shader on the processing unit is generated based on the updated shader representation (block 808). By way of example, prediction engine 106 generates a second performance prediction 210 of the shader (implemented by the updated shader source code 204) on a processing unit. In contrast to the first performance prediction of the shader generated at block 804, the second performance prediction 210 predicts performance of the shader after the update to the shader source code. As an example, the first performance prediction generated at block 804 corresponds to a first predicted execution time of the shader, whereas the second performance prediction generated at block 808 corresponds to a second predicted execution time of the shader. Notably, the first and second execution times, in this example, may vary (e.g., the second execution time has decreased relative to the first execution time, or vice versa) due to the update to the shader source code.

A predicted trend of the shader is determined by comparing the first prediction of performance of the shader to the second prediction of performance of the shader (block 810). In accordance with the principles discussed herein, the predicted trend indicates a predicted improvement or decline in the performance of the shader after the update to the shader source code. By way of example, the prediction engine 106 determines a predicted trend 212 of the shader by comparing the first performance prediction generated at block 804 to the second performance prediction generated at block 808. Thus, the predicted trend 212 is a relative prediction in which the machine learning models 208 predict a difference in shader performance after a source code update 114. The trend in shader performance thus represents an effect of the source code update 114 on the shader performance relative to a previous version of the source code.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the development environment 104, the prediction engine 106, the display controller 108, and the developer tools 110) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   receiving, using hardware of one or more computing devices, an update to shader source code for implementing a shader;
   after the update to the shader source code and using the hardware, compiling the shader source code with the update to generate a representation of the shader;
   providing the representation of the shader as input to one or more machine learning models trained based on historical data describing performance of one or more other shaders on a processing unit;
   receiving, as an output from the one or more machine learning models, a prediction of performance of the shader on the processing unit based on the update to the shader source code; and
   outputting, using the hardware, feedback about the update, the feedback including the prediction of performance of the shader.

2. The method of claim 1, wherein the prediction of performance is generated without running or simulating the shader on the processing unit.

3. The method of claim 1, wherein the prediction of performance includes an estimation of a statistic based on execution time of the shader to perform at least one operation for the processing unit.

4. The method of claim 3, wherein the statistic based on execution time comprises an average execution time of the shader to perform the at least one operation for the processing unit.

5. The method of claim 3, wherein the statistic based on execution time comprises a variance in execution time of the shader to perform the at least one operation for the processing unit.

6. The method of claim 1, wherein the prediction of performance includes a predicted trend between a first performance prediction of the shader before the update to the shader source code and a second performance prediction of the shader after the update to the shader source code.

7. The method of claim 6, wherein the predicted trend comprises a percentage improvement in the performance of the shader.

8. The method of claim 6, wherein the predicted trend comprises a percentage decline in the performance of the shader.

9. The method of claim 1, wherein the update to the shader source code includes at least one of:
   an addition of at least one line of code to the shader source code;
   removal of at least one line of code from the shader source code;
   a modification within at least one line of code of the shader source code;
   a change to compiler settings; or
   a change to a state specific to an application programming interface.

10. The method of claim 1, wherein the update is received via user input to a user interface, and wherein the feedback about the update is output via the user interface.

11. The method of claim 1, wherein the update is received from an automated bot, and wherein the feedback about the update is output to the automated bot.

12. The method of claim 1, further comprising generating an additional prediction of performance of the shader on at least one additional processing unit based on the update to the shader source code, wherein the feedback further includes the additional prediction of performance of the shader.

13. A system comprising:
    at least one developer tool, implemented at least in part using hardware of one or more computing devices, to update shader source code for implementing a shader;
    a compiler, implemented at least in part using the hardware, to generate a representation of the shader by compiling the updated shader source code; and
    a prediction engine, implemented at least in part using the hardware, to generate a prediction of performance of the shader on a processing unit after the update of the shader source code by processing the representation of the shader using one or more machine learning models, wherein the one or more machine learning models are trained based on historical data describing performance of one or more other shaders on the processing unit.

14. The system of claim 13, further comprising a display controller to display the prediction of performance of the shader in a user interface.

15. The system of claim 13, wherein the representation of the shader comprises one or more of:
    an intermediate language;
    machine-level code; or
    a control-flow graph.

16. The system of claim 13, wherein the prediction of performance includes an estimation of a statistic based on execution time of the shader to perform at least one operation for the processing unit.

17. A method comprising:
    receiving, using hardware of one or more computing devices, a shader representation of a shader, the shader representation generated by compiling shader source code for the shader;
    generating, using the hardware, a first performance prediction of the shader on a processing unit based on the shader representation, the first performance prediction of the shader corresponding to a first output from one or more machine learning models, wherein the one or more machine learning models are trained based on historical data describing performance of one or more other shaders on the processing unit;

receiving, using the hardware, an updated shader representation of the shader, the updated shader representation generated by compiling the shader source code after an update to the shader source code;

generating, using the hardware, a second performance prediction of the shader on the processing unit, the second performance prediction generated using the updated shader representation, the second performance prediction of the shader corresponding to a second output from the one or more machine learning models; and determining, using the hardware, a predicted trend of the shader by comparing the first performance prediction of the shader to the second performance prediction of the shader, the predicted trend indicating an improvement or decline in performance of the shader caused by the update to the shader source code.

18. The method of claim 17, further comprising outputting, in a user interface, the predicted trend indicating the improvement or decline in the performance of the shader caused by the update to the shader source code.

19. The method of claim 18, further comprising outputting, in the user interface, the second performance prediction of the shader, the second performance prediction of the shader displayed concurrently with the predicted trend in the user interface.

20. The method of claim 17, wherein the first performance prediction and the second performance prediction include respective estimations of a statistic based on execution time of the shader to perform at least one operation for the processing unit.

* * * * *